United States Patent [19]
Kaufmann et al.

[11] 3,929,769
[45] Dec. 30, 1975

[54] PROCESS FOR THE MANUFACTURE OF STEROID EPOXIDES

[75] Inventors: Heinz Kaufmann, Fullinsdorf; Albert Wettstein, Riehen, both of Switzerland

[73] Assignee: Ciba-Geigy Corporation, Ardsley, N.Y.

[22] Filed: Mar. 14, 1974

[21] Appl. No.: 451,261

Related U.S. Application Data

[63] Continuation of Ser. No. 360,230, May 14, 1973, abandoned.

[30] Foreign Application Priority Data

May 19, 1972 Switzerland.......................... 7479/72

[52] U.S. Cl................. 260/239.55 R; 260/239.55 D
[51] Int. Cl.²........................................ C07J 17/00
[56] References Cited
UNITED STATES PATENTS 3,364,241   1/1968   Pike et al........................ 260/239.55
3,875,148   4/1975   Elks et al. .................. 260/239.55 R

*Primary Examiner*—Elbert I. Roberts
*Attorney, Agent, or Firm*—Joseph G. Kolodny; John J. Maitner; Theodore O. Groeger

[57] ABSTRACT

The invention is directed to a process for the manufacture of $5\alpha,6\alpha$-oxido-steroids starting from corresponding $5\alpha,6\beta$-dihydroxy steroids. The starting steroids are treated with a fluorinated amine of the formula

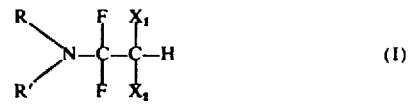

wherein $X_1$ is chlorine or fluorine, $X_2$ is chlorine, fluorine or trifluoromethyl and R and R' are alkyl groups or together with the nitrogen atom form a heterocyclic radical. There are preferably used compounds in which R and R' are lower alkyl groups, such as for instance N-(2-chloro-1,1,2-trifluoroethyl)-diethylamine, and the reaction is performed in an inert solvent e.g. ethylene chloride, at room temperature or elevated temperature, if desired, in the presence of another organic nitrogen base. The compounds of the process are intermediates for the preparation of therapeutically useful 6-fluoro-steroids, such as 6-fluoro-corticoids. In particular, the epoxides can be further reacted with the same fluorinated amine used in their preparation to give the $6\beta,5\alpha$-fluorohydrins.

11 Claims, No Drawings

PROCESS FOR THE MANUFACTURE OF STEROID EPOXIDES

This application is a continuation of application Ser. No. 360,230 filed May 14, 1973 and now abandoned.

The present invention provides a new process for the manufacture of 5α,6α-steroid epoxides from 5α,6β-dihydroxy steroids.

Various methods for the manufacture of 5α,6α-steroid epoxides from 5α,6β-trans-diols have already been described. These processes are characterised in that they must be carried out in two reaction steps: after esterification of one or both hydroxy groups, or substitution of the 6-hydroxy group by a halogen substituent, an acyloxy radical or the halogen substituent is eliminated under basic conditions and the epoxide ring thereby closed.

The process according to the invention consists in reacting a 5α,6β-dihydroxy steroid with an amine of the formula (I)

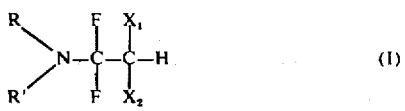

in which $X_1$ represents chlorine or fluorine, $X_2$ represents chlorine, fluorine, or a trifluoromethyl group, and R and R' represent alkyl radicals or together with the nitrogen atom to which they are bonded jointly represent a heterocyclic radical with 5 to 7 ring atoms, in an inert organic solvent, in the course of which the trans-diol group in the steroid used as starting material is converted into an epoxy group. To attain maximum yields it is advantageous to carry out the process according to the invention under anhydrous conditions and in atmosphere of inert gas, e.g. nitrogen gas.

The advantage of this new process is that it enables 5α,6β-dihydroxy steroids to be converted directly into 5α,6α-steroid epoxides in one reaction step under mild conditions and with very good yield.

Reagents of the formula (I) have already been used previously in order to convert primary and secondary alcohols into the corresponding fluorine compounds (cf. for example N. N. Yarovenko & M. A. Raksha, Zhur. Obshch. khim. 29, (1959), J. Gen. Chem. 29, 2125 (1959)). In this reaction the OH group is replaced directly by fluorine, normally accompanied by inversion of the configuration at the carbon atom involved. This reaction has also been applied already to primary and secondary steroid alcohols (cf. for example U.S. Pat. No. 3,056,807, Swiss Pat. No. 407,110). However, the teaching of this prior art does not anticipate how adjacent trans-diols would behave when reacted with reagents of the formula (I). The experiments described in the present application show that what takes place with 5α,6β-dihydroxy steroids is not, surprisingly, the expected exchange reaction of the secondary hydroxy group in the 6-position, but a rapid conversion into 5α,6α, epoxy steroids.

The cited alkyl radicals in the reagents of the formula (I) are preferably lower alkyl radicals with 1 to 8 carbon atoms, for example methyl, ethyl, propyl, butyl, pentyl, hexyl, heptyl, octyl, radicals or the isomers thereof. Lower alkyl radicals with 1 to 4 carbon atoms are particularly preferred. Examples of heterocyclic radicals with 5 to 7 ring atoms are alkyleneamino, oxaalkyleneamino, and azaalkyleneamino radicals, e.g. pyrrolidino, piperazino, morpholino, and piperidino radicals, as well as corresponding heterocyclic radicals which are substituted with lower alkyl radicals, e.g. 2-methyl-pyrrolidino, 4-methyl-piperazino, or 2,4-dimethylpiperazino radicals.

Examples of suitable reagents of the formula (I) for the process according to the invention are N-(2-chloro-1,1,2-trifluoro-ethyl)-dimethylamine, N-(2-chloro-1,1,2-trifluoroethyl)-diethylamine, N-(1,1,2,2-tetrafluoro-ethyl)-diethylamine, N-(2-chloro-1,1,2-trifluoro-ethyl)-methylamine, N-(2,2-dichloro-1,1-difluoro-ethyl)-diethylamine, N-(1,1,2,3,3,3-hexafluoro-propyl)-diethylamine etc. The preferred reagent for carrying out the conversion of 5α,6β-dihydroxy steroids into 5α,6,6O -epoxy steroids is N-(2-chloro-1,1,2-trifluoro-ethyl)-diethylamine.

The reagents of the formula (I) are known compounds and can be manufactured in known manner by addition of a secondary amine of the formula RR'NH to a halogenated olefin of the formula $F_2C = CX_1X_2$, wherein R, R', $X_1$ and $X_2$ have the meanings given hereinbefore.

Inert organic solvents which are suitable for carrying out the process according to the invention are those which do not react with the reagents of the formula (I), e.g. aromatic hydrocarbons such as benzene or toluene, aliphatic hydrocarbons such as hexane or cyclohexane, halogenated aromatic and aliphatic hydrocarbons, such as chlorobenzene, methylene chloride, chloroform, carbon tetrachloride, 1,2-dichloroethane or 1,1,2-trichloro-ethane, esters, for example ethyl acetate, ketones, such as acetone or methyl - ethyl ketone, and ethers, such as diethyl ether, tetrahydrofuran or dioxane.

It is an advantage if the starting materials are readily soluble in the solvents used for the conversion into epoxides. However, this is not a condition, because the reagents of the formula (I), particularly when used in excess, are able to act as solubiliser and thus also enable the reaction to take place with starting materials which are but very poorly soluble in the solvents employed.

The reagent of the formula (I) is used preferably in excess for the process according to the invention, in particular in an amount of 1.1–10 moles per mole of the 5α,6α-dihydroxy steroid used as starting material.

The reaction according to the invention can be carried out at temperatures e.g. between 0°C and the boiling point of the solvent used. Preferably the reaction is carried out at a temperature of 10° to 30°C, in case oxygenfree solvents are used. In solvents containing oxygen, for example tetrahydrofuran, ethyl acetate, or acetone, the reaction rate is sharply reduced. To bring about here as rapid and complete a reaction of the 5α,6β-dihydroxy steroids as possible, it is advantageous to carry out the process at elevated temperature, preferably at the boiling temperature of the solvent used.

The reaction time depends upon the solvent, the solubility of the starting material used, and the reaction temperature. In oxygen-free solvents it is in most cases from 1–60 minutes if the process is carried out in the temperature range from 10° to 30°C. In oxygen-containing solvents, e.g. tetrahydrofuran, ethyl acetate, or acetone, at elevated temperature, reaction times between 1 hour and 24 hours are necessary.

As follows from our application, Ser. No. 360,229 Case 4-8197, filed on the same date, in which a new process is claimed for the manufacture of steroid -6β,5α-fluorohydrines from 5α,6α-steroid epoxides, the steroid epoxides manufactured by the process according to the invention can be reacted with an amine of formula (I) to give the cited fluorohydrines in a slow secondary reaction. The reaction rate is quickest in oxygen-free solvents; on the other hand in oxygen-containing solvents the reaction proceeds only very slowly. For every combination of the parameters cited hereinabove, such as starting steroid, solvent, and temperature, it is advisable to ascertain the optimum reaction time for obtaining as high a yield as possible of steroid epoxide by following the reaction course in thin-layer chromatograms, and then ensuring that this optimum reaction time is not appreciably exceeded while the reaction according to the invention is being carried out.

That the above mentioned secondary reaction, in which the 5α,6α-steroid epoxides obtained by the process according to the invention pass over into 6β,5α-steroid fluorohydrines, proceeds only very slowly in oxygen-containing solvents is probably due to the fact that the protons necessary for initiating this reaction are so strongly bonded to the oxygen atoms of the solvent molecules that they are not available for the initiation of the further reaction of the steroid epoxides obtained according to the invention to fluorohydrines.

On using solvents in which the 5α,6β-dihydroxy steroids used as starting materials are soluble to an extremely sparing degree, for example aromatic hydrocarbons, such as benzene or toluene, and in which for this reason the reaction according to the invention of the starting materials to 5α,6α-steroid epoxides is very substantially retarded, there is the possibility that already formed reaction product enters into the above mentioned secondary reaction which leads to 6β,5α-fluorohydrines. In a particular embodiment of the process according to the invention this possible secondary reaction is prevented by adding to the reaction solution an organic nitrogen base, preferably a secondary or tertiary aliphatic amine, e.g. diethylamine, triethylamine, or piperidine, or an aromatic nitrogen base, e.g. pyridine, in an amount of 0.1–1 equivalent, relative to the starting steroid used. The function of the base is to bind the protons which are liberated during the reaction of 5α-6β-dihydroxy steroids to 5α,6α-steroid epoxides, so that they are no longer available for the initiation of the above mentioned secondary reaction. It is also possible to apply this special embodiment of the process on using the other oxygen-free solvents cited hereinbefore. In doing so the reaction time is prolonged, but the isolation of the pure 5α,6α-steroid epoxide is made easier, since the possible secondary reaction to 6β,5α-steroid fluorohydrines is greatly retarded. If the process according to the invention is carried out in an oxygen-containing solvent, then it is superfluous to add an organic nitrogen base, since its function-trapping the protons which form during the reaction is taken over by the solvent molecules.

As starting materials for carrying out the process according to the invention it is possible to use 5α,6β-dihydroxy steroids of the cholestane, spirostane, androstane or pregnane series, which in addition to the cited trans-diol group in the 5,6 position can also contain further substituents. Some of these substituents may also possibly enter into reactions under the conditions of the process according to the invention. Thus, for example, free primary or secondary hydroxy groups can be replaced by fluorine, converted into chlorofluoroacetoxy groups, or split off. In particular, there are used as starting materials for the process according to the invention 5α,6β-diols of the above mentioned steroid series which carry functional groups which are inert towards reagents of the formula (I), i.e. those which do not carry any free primary or secondary hydroxy or amino groups.

Preferred starting materials of the pregnane series are e.g. those of the general formula (II)

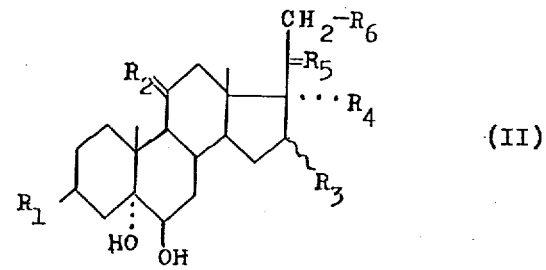

wherein $R_1$ represents an esterified or etherified hydroxy group, $R_2$ represents two hydrogen atoms or a hydroxy group in the β-position together with hydrogen, or represents an oxo group, $R_3$ represents a methyl group in the α- or β-position or an esterified or etherified hydroxy group, $R_4$ represents a hydrogen atom or a free, esterified or etherified hydroxy group, $R_5$ represents an oxo group or an esterified or etherified hydroxy group together with hydrogen, and $R_6$ represents hydrogen or fluorine or represents an esterified or etherified hydroxy group. Suitable starting materials are also steroids of the pregnane series whose D-ring and side chains have the partial formulae (III) or (IV)

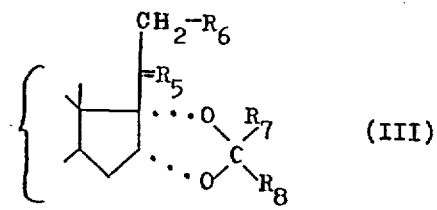

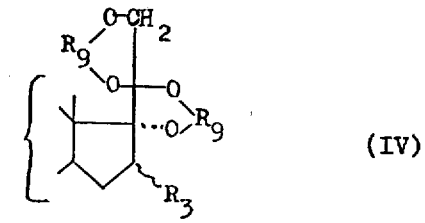

wherein $R_3$, $R_5$ and $R_6$ have the meanings given hereinabove, $R_7$ and $R_8$ represent two similar or different lower alkyl radicals with 1 to 4 carbon atoms, for example methyl, ethyl, propyl, or butyl groups, or one of the two radicals $R_7$ and $R_8$ represents one of the cited lower alkyl groups and the other represents a phenyl group, or $R_7$ and $R_8$ together with the carbon atom to which they are bonded form a 5 to 7-membered alicyclic hydrocarbon radical, and $R_9$ represents a methylene group or a carbon atom which carries a lower alkyl radical and a hydrogen atom or two similar or different lower alkyl radicals with 1 to 4 carbon atoms. To be particularly high-lighted are 5α,6β-dihydroxy steroids with a 16α,17α-isopropylidenedioxy group and those with the dihydroxyacetone side-chain typical of corticosteroids in the protected form of the bismethylenedioxy derivative.

The above mentioned esterified hydroxy groups are above all those which are derived from organic carboxylic acids of the aliphatic, alicyclic, aromatic, or heterocyclic series, in particular from those with 18 carbon atoms, for example from formic acid, acetic acid, propionic acid, butyric acids, valeric acids, such as n-valeric acid, trimethylacetic acid, or from the capronic acids, such as β-trimethyl-propionic acid or diethylacetic acid; or from enanthic, caprylic, pelargonic, capric acids, undecylic acids, for example undecylenic acid; or from cyclopropane-, cyclobutane-, cyclopentane- and cyclo-hexanecarboxylic acid; from cyclobutyl-, cyclopentyl-, cyclo-hexyl- or phenyl-acetic acids or phenylpropionic acids; from benzoic acid, phenoxyalkane acids, such as phenoxyacetic acid, furan-2-carboxylic acid, nicotinic acid, or isonicotinic acid.

The hydroxy groups cited hereinabove are primarily those which are derived from alcohols with 1 to 8 carbon atoms, e.g. from lower aliphatic alcohols such as methanol, ethanol, propanol, isopropanol, butyl or amyl alcohols, or from araliphatic alcohols, in particular from monocyclic aryl-lower aliphatic alcohols such as benzyl alcohol, or from heterocyclic alcohols, such as α-tetrahydropyranol or-furanol.

Examples of particularly suitable starting materials for carrying out the process according to the invention are:

3β-acetoxy-5α,6β-di-hydroxy-cholestane; 3β-acetoxy-5α,6β-dihydroxy-spirostane;

3β,17β-diacetoxy-5α,6β-dihydroxy-androstan; 3β-acetoxy-5α,6β-dihydroxy-androstan-17-one;

3β,20α-diacetoxy- or 3β,20β-diacetoxy-5α,6β-dihydroxy-pregnane;

3β-acetoxy-5α,6β-dihydroxypregnan-20-one;

3β-acetoxy-5α,6β,17α-trihydroxy-pregann-20-one;

3β-acetoxy-5α,6β,17α-trihydroxy-16α-methyl-pregnan-20-one;

3β,21-diacetoxy-5α,6β,17α-trihydroxy-pregnan-20-one;

3β-acetoxy-5α,6β-dihydroxy-16α,17α,iso-propylidendioxy-pregnan-20-one;

3β,21-diacetoxy-5α,6β-dihydroxy-16α,17α-isopropylidendioxy-pregnan-20-one;

3β-acetoxy-5α,6β-dihydroxy-17α,20;20,21 -bis-methylene-dioxypregnane;

3β-acetoxy-5α,6β-dihydroxy-16α-methyl-17α,20;20,21 -bismethylenedioxy-pregnane.

The starting materials for the process according to the invention are known and can be manufactured in known manner from mixtures of the corresponding 5α,6α- and 5β,6β-steroid epoxides by hydrolytic opening of the epoxide ring. Because the epoxide rings are opened trans-diaxially, the stereochemically pure 5α,6β-diol results in each case from the mixture of the stereoisomeric 5,6-epoxides (cf. for example French Pat. No. 1,258,846.

The process according to the invention now provides a simple way of closing these trans-diols to steroidal pure 5α,6α-epoxides. Overall, a method is thus available which permits the conversion of a mixture of 5α,-6α- and 5β,6β-steroid epoxides, as is formed in the epoxidation of Δ⁵-steroids with organic peracids, into stereochemically pure 5α,6α-steroid epoxides.

The majority of the steroid epoxides accessible by the process according to the invention are known compounds. These are valuable intermediates for the manufacture of pharmacologically interesting compounds. Thus, for example, it is possible to open the epoxide ring by treatment with hydrogen fluoride or with a hydrogen fluoride donor to give the 6β,5α-fluorohydrine, whereby in the case of starting materials from the corticoid series and after subsequent removal of the tertiary 5α-hydroxy group there result Δ⁴-3-oxo-6β-fluorine substituted compounds which, after isomerisation to the corresponding 6α-fluorine compounds and optionally after the introduction of further functional groups, e.g. of a 9α-fluorine substituent and/or a Δ¹-double bond, yield compounds which display a markedly antiinflammatory activity. The opening of the epoxide ring with hydrogen chloride leads to 6-chlorine substituted compounds and thus e.g. in the pregnane series opens up a route of access to preparations of high gestagen activity, e.g. chlormadinone.

The following Examples describe the invention in more detail.

EXAMPLE 1

A suspension of 1 g 3β-acetoxy-5α,6β,17α-trihydroxy-16α-methyl-pregnan-20-one in 20 ml of methylene chloride is stirred at room temperature under nitrogen and anhydrous conditions. Using a syringe 1.2 ml of N-(2-chloro-1,1,2-trifluoro-ethyl)-diethylamine are added after 10 minutes through a side arm of the apparatus provided with a plastic stopper. The starting material has completely dissolved after about 10 minutes. The clear, slightly yellow solution is then rapidly cooled to about −10°C and treated with a substantial amount of solid sodium hydrogen carbonate. After it has been stirred for 10 minutes at −10°C the reaction mixture is extracted with ether and the organic phases are washed neutral with water, dried, and evaporated. The N,N-diethyl-chlorofluoroacetamide which has evolved from the reagent is isolated by purifying the crude product on a chromatography column with 50 g of silica gel and prepared with toluene. The N,N-diethyl-chlorofluoro-acetamide is isolated first with toluene and toluene/ethyl acetate (95:5), and the pure 3β-acetoxy-5α,6α, epoxy-16α-methyl-17α-hydroxypregna-20-one with toluene/ethyl acetate (95:5) and (9:1), which melts after one recrystallisation from methylene chloride/ether/petroleum ether at 189°–191°C.

EXAMPLE 2

A suspension of 1 g 3β-acetoxy-5α-6β,17α-trihydroxy-16α-methyl-pregnan-20-one in 20 ml of 1,2-dichloroethane is stirred at room temperature under nitrogen and anhydrous conditions. Using a syringe (cf. Example 1) 1.2 ml of N-(2-chloro-1,1,2-trifluoroethyl)-diethylamine are added after 10 minutes. It takes about 20 minutes for the starting material to dissolve completely. Processing and purification of the crude product as in Example 1 yields 3β-acetoxy-5α,-6α-epoxy-16α-methyl-17α-hydroxy-pregnan-20-one, which according to melting point, mixed freezing point, IR spectrum, and running distance is identical with the product obtained in Example 1.

EXAMPLE 3

A solution of 1 g of 3β-acetoxy-5α,6β,17α-trihydroxy-16α-methyl-pregnan-20-one in 25 ml of absolute tetrahydrofuran is stirred at room temperature under nitrogen and anhydrous conditions. Using a syringe (cf. Example 1) 1.25 ml of N-(2-chloro-1,1,2-trifluoroethyl)-diethylamine are added after 10 minutes. The reaction mixture is subsequently boiled under reflux for 7 hours, then cooled to 0°C, substantial solid sodium hydrogen carbonate is added, and the mixture is extracted with ether. The crude product obtained after washing the organic phases neutral with water and drying and evaporating them is purified on a chromatography column with 50 g of silica gel and prepared with toluene. Primarily N,N-diethyl-chlorofluoroacetamide is eluted with toluene/ethyl acetate (95:5), and subsequently 3β-acetoxy-5α,6α-epoxy-16α-methyl-17α-hydroxy-pregnan-20-one with toluene/ethyl acetete (95:5) and (9:1); m.p. 190°–191°C.

EXAMPLE 4

A solution of 1 g of 3β-acetoxy-5α,6β,17α-trihydroxy-16α-methyl-pregnan-20-one in 50 ml of absolute acetone is heated in a heating bath of 60°C under nitrogen and anhydrous conditions. Using a syringe (cf. Example 1) 1.5 ml of N-(2-chloro-1,1,2-trifluoroethyl)-diethylamine are added and the reaction mixture is stirred under the conditions given hereinabove. The solution, which slowly turns yellow, contains no more starting material after 2 hours reaction time. After 3 hours reaction time the reaction mixture is cooled to 0°C and processed and separated as described in Example 3, to yield 3β-acetoxy-5α,6α-epoxy-16α-methyl-17α-hydroxy-pregnan-20-one, m.p. 189°–191°C. Parallel experiments show that under the conditions given in this Example the further reaction of the end product to 6β,5α-fluorohydrine can only be expected at reaction times of over 5 hours.

EXAMPLE 5

1 g of 3β-acetoxy-5α,6α,17α-trihydroxy-16α-methyl-pregnan-20-one is reacted as described in Example 4, but ethyl acetate is used as solvent and the temperature of the heating bath is 80°C. This reaction proceeds somewhat faster than that in acetone and is terminated after about 1–2 hours. Processing and purification (cf. Example 3) yield pure 3β-acetoxy-5α,6α-epoxy-16α-methyl-17α-hydroxy-pregnan-20-one; m.p. 189°–191°C.

EXAMPLE 6

A suspension of 1 g of 3β-acetoxy-5α,6β,17α-trihydroxy-16α-methyl-pregnan-20-one in 20 ml of absolute benzene is treated with 0.2 ml of triethylamine and the mixture is stirred at room temperature under nitrogen and anhydrous conditions. Using a syringe (cf. Example 1) 2 ml of N-(2-chloro-1,1,2-trifluoro-ethyl)-diethylamine are added after 10 minutes. A slow dissolution of the starting material is observed after about 2½ – 3 hours, and after about 3– 3½ hours a slightly yellow, clear solution has formed. The reaction mixture is then rapidly cooled to −10°C and processed as described in Example 3. Pure 3β-acetoxy-5α,6α.epoxy-16α-methyl-17α-hydroxy-pregnan-20-one is obtained (m.p. 189°–190°C). The same result is obtained by using in the above Example absolute toluene instead of absolute benzene as solvent.

EXAMPLE 7

A suspension of 1 g 3β-acetoxy-5α,6β,17α-trihydroxy.16α-methyl-pregnan 20-one in 20 ml of methylene chloride is treated with 0.2 ml of diethylamine and the mixture is stirred at room temperature under nitrogen and anhydrous conditions. Using a syringe (cf. Example 1) 1.5 ml of N-(2-chloro-1,1,2-trifluoro-ethyl)-diethylamine are added after 10 minutes. A clear solution and consequently a complete reaction of the starting material is attained after about 2½ – 3 hours. The reaction mixture is cooled to 0°C and processing and isolation is carried out as in Example 3. Pure 3β-acetoxy-5α,6α-epoxy-16α-methyl-17α-hydroxy-pregnan-20-one is obtained; m.p. 189°–191°C.

EXAMPLE 8

A suspension of 1 g of 3β-acetoxy-5α,6β-dihydroxy-pregnan-20-one in 20 ml of methylene chloride is stirred at room temperature under nitrogen and anhydrous conditions. Using a syringe (cf. Example 1) 1 ml of N-(2-chloro-1,1,2-trifluoro-ethyl)-diethylamine is added after 10 minutes. The clear yellow solution which forms after 2 to 3 minutes is cooled to −10°C and treated with a substantial amount of solid sodium hydrogen carbonate. The reaction mixture is stirred for 10 minutes at −10°C and extracted with ether. The organic phases are washed neutral with water, dried over sodium sulphate and evaporated. The crude product is purified on a chromatography column with 50 g of silica gel and prepared with toluene. Primarily N'N-diethyl-chloro-fluoroacetamide is eluted with toluene and then the pure 3β-acetoxy-5α,6α,epoxy-pregnan-20-one with toluene/ethyl acetate (95:5) and (9:1); m.p. 164°–166°C.

EXAMPLE 9

A suspension of 1 g of 3β-acetoxy-5α,6β-dihydroxy-pregnan-20-one in 20 ml of methylene chloride is treated with 0.2 ml of triethylamine and the mixture is stirred at room temperature under nitrogen and anhydrous conditions. Using a syringe (cf. Example 1) 1 ml of N-(2-chloro-1,1,2-trifluoro-ethyl)-diethylamine is added after 10 minutes. After a reaction time of about 5 hours the suspension begins to turn yellow, and after about 6¾ to 7 hours a clear solution forms which in a thin layer chromatogram contains only 3β-acetoxy-5α,-6α-epoxy-pregnan-20-one. Processing and chromatographing as described in Example 8 yields the pure product with a melting point of 164°C–165°C.

EXAMPLE 10

A suspension of 1 g of 3β,21-diacetoxy-5α,6β,17α-trihydroxy-pregnan-20-one in 20 ml of 1,2-dichloroethane is stirred at room temperature under nitrogen and anhydrous conditions. Using a syringe (cf. Example 1) 1 ml of N-(2-chloro-1,1,2-trifluoro-ethyl)-diethylamine is added after 10 minutes). A clear, slightly yellow solution forms within 5 minutes. After a reaction time of 10 minutes, processing and chromatography is carried out as described in Example 8. The resulting pure 3β,21-diacetoxy-5α,6α-epoxy-17α-hydroxy-pregnan-20-one melts at 210°–212°C.

EXAMPLE 11

A suspension of 1 g of 3β-acetoxy-5α,6β-dihydroxy-16α,17β-isopropylidene-dioxy-pregnan-20-one in 25 ml of 1,2-dichloroethane is stirred at room temperature under nitrogen and anhydrous conditions. Using a syringe (cf. Example 1) 1 ml of N-(2-chloro-1,1,2-trifluoro-ethyl)-diethylamine is added after 10 minutes. After about 2 minutes a clear yellow solution forms which after 20 minutes contains no more starting material on the evidence of a thin-layer chromatogram. Processing and chromatographing as described in Example 8 yields pure 3$\beta$-acetoxy-5$\alpha$,6$\alpha$-epoxy-16$\alpha$,17$\alpha$-isopropylidene-dioxy-pregnan-20-one which melts at 212°–215°C.

EXAMPLE 12

Upon addition of 0.1 ml of triethylamine, 1 g of 3$\beta$-acetoxy-5$\alpha$,6$\beta$-dihydroxy-androstan-17-one is suspended in 25 ml of methylene chloride and the mixture is stirred at room temperature under nitrogen and anhydrous conditions. Using a syringe (cf. Example 1) 1.5 ml of N-(2-chloro-1,1,2-trifluoro-ethyl)-diethylamine are added after 10 minutes. A clear solution has formed after about 20 minutes. Processing and chromatographing as described in Example 8 yields pure 3$\beta$-acetoxy-5$\alpha$,6$\alpha$-epoxy-androstan-17-one which is crystallised from methylene chloride/ether/petroleum ether and has a melting point of 218°–222°C.

EXAMPLE 13

Upon addition of 0.1 ml of triethylamine, 1 g of 3$\beta$-acetoxy-5$\alpha$,6$\beta$-dihydroxy-spirostane is suspended in 25 ml of methylene chloride and the mixture is stirred at room temperature under nitrogen and anhydrous conditions. Using a syringe (cf. Example 1) 1.5 ml of N-(2-chloro-1,1,2-trifluoro-ethyl)-diethylamine are added after 10 minutes. After 45 minutes processing is effected as described in Example 8 and the crude product is recrystallised from methylene chloride/ether to yield the pure 3$\beta$-acetoxy-5$\alpha$,6$\alpha$-epoxy-spirostane which melts at 231°–232°C.

We claim:
1. A process for the manufacture of 5$\alpha$,6$\alpha$-steroid epoxides, wherein a 5$\alpha$,6$\beta$-dihydroxy steroid is reacted in an inert organic solvent with an amine of the formula (I)

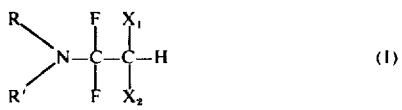

in which $X_1$ represents chlorine or fluorine, $X_2$ represents chlorine, fluorine or trifluoromethyl group, and R and R' represent alkyl radicals or together with the nitrogen atom to which they are bonded jointly represent a heterocyclic radical with 5 to 7 ring atoms, and the 5,6 epoxides are isolated.

2. A process according to claim 1, wherein the reaction is carried out under anhydrous conditions.

3. A process according to claim 1, wherein a reagent of the formula I is used in which R and R' represent lower alkyl radicals with 1 to 4 carbon atoms.

4. A process according to claim 1, wherein a reagent of formula I is used, in which R and R' together with the nitrogen atom to which they are bonded represent an alkyleneamino, oxaalkyleneamino or azaalkyleneamino radical.

5. A process according to claim 3, wherein N-(2-chloro-1,1,2-trifluoro-ethyl-)diethylamine is used as reagent of the formula (I).

6. A process according to claim 1, wherein the reaction is carried out in a solvent selected from the group consisting of an aromatic, an aliphatic hydrocarbon or a halogenated derivative thereof at a temperature of 10°–30°C.

7. A process according to claim 6, wherein methylene chloride or 1,2-dichloro ethane is used.

8. A process according to claim 1, wherein the reaction is carried out in a oxygenated solvent selected from the group consisting of an alkyl ester of an organic carboxylic acid, an aliphatic ketone or an aliphatic or alicyclic ether at temperature of 30°–120°.

9. A process according to claim 1, wherein the reaction is carried out in the presence of an organic nitrogen base.

10. A process according to claim 8, wherein the reaction is carried out in the presence of an organic nitrogen base in an amount of 0.1 to 1 equivalent relative to the starting steroid used.

11. A process according to claim 1, wherein a 5$\alpha$,6$\beta$-dihydroxy steroid selected from the group consisting of a compound of the formula (II)

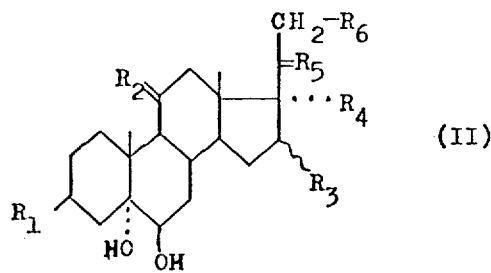

wherein $R_1$ represents an esterified or etherified hydroxy group, $R_2$ represents two hydrogen atoms or a hydroxy group in the $\beta$-position together with hydrogen, or represents an oxo group, $R_3$ represents a methyl group in the $\alpha$- or $\beta$-position or an esterified or etherified hydroxy group, $R_4$ represents a hydrogen atom or a free, esterified or etherified hydroxy group, $R_5$ represents an oxo group or an esterified or etherified hydroxy group together with hydrogen, and $R_6$ represents a hydrogen or fluorine atom or represents an esterified or etherified hydroxy group, and a corresponding compound of the pregnane series whose D ring and side chain corresponds to the partial formula (III)

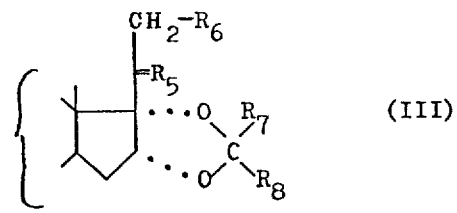

wherein
$R_5$ and $R_6$ have the same meaning and
$R_7$ and $R_8$ represents two similar or different lower radicals with 1 to 4 carbon atoms and one of the two radicals $R_7$ and $R_8$ can also represent a phenyl group, and a corresponding compound of the pregnane series whose ring D and side chain correspond to the partial formula IV

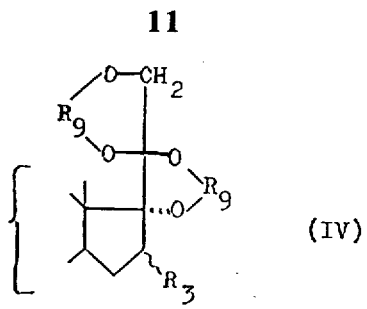
(IV)
wherein $R_3$ has the same meaning and $R_9$ represents a methylene group or a carbon atom which carries a lower alkyl alkyl radical and a hydrogen atom, or two similar or different lower alkyl radicals with 1 to 4 carbon atoms, is used as starting material.
* * * * *